US012403493B2

(12) United States Patent
Hang et al.

(10) Patent No.: US 12,403,493 B2
(45) Date of Patent: Sep. 2, 2025

(54) ALL-PLASTIC SPRAY GUN

(71) Applicant: NINGBO JINYU TECHNOLOGY INDUSTRY CO., LTD., Ningbo (CN)

(72) Inventors: Cheng Hang, Ningbo (CN); Gongshun Duan, Ningbo (CN)

(73) Assignee: NINGBO JINYU TECHNOLOGY INDUSTRY CO., LTD., Ningbo (CN)

(*) Notice: Subject to any disclaimer, the term of this patent is extended or adjusted under 35 U.S.C. 154(b) by 208 days.

(21) Appl. No.: 18/373,978

(22) Filed: Sep. 28, 2023

(65) Prior Publication Data

US 2025/0058340 A1 Feb. 20, 2025

Related U.S. Application Data

(63) Continuation of application No. PCT/CN2023/115077, filed on Aug. 17, 2023.

(51) Int. Cl.
*B05B 11/10* (2023.01)

(52) U.S. Cl.
CPC ...... *B05B 11/1077* (2023.01); *B05B 11/1009* (2023.01)

(58) Field of Classification Search
CPC ............. B05B 11/1077; B05B 11/1009; B05B 11/1011; B05B 11/00; B05B 11/0005; B05B 11/025
See application file for complete search history.

(56) References Cited

U.S. PATENT DOCUMENTS

| | | | | | |
|---|---|---|---|---|---|
| 5,169,032 | A * | 12/1992 | Steijns | B05B 11/0029 | 222/153.07 |
| 5,228,600 | A * | 7/1993 | Steijns | B05B 1/12 | 222/153.05 |
| 6,641,003 | B1 * | 11/2003 | Foster | B05B 11/007 | 222/383.1 |
| 2006/0086762 | A1 * | 4/2006 | Foster | B05B 11/1087 | 222/383.1 |
| 2010/0200675 | A1 * | 8/2010 | Tu | B05B 11/1011 | 239/428.5 |
| 2025/0058340 | A1 * | 2/2025 | Hang | B05B 11/1011 | |

FOREIGN PATENT DOCUMENTS

CN 215235147 U * 12/2021

* cited by examiner

*Primary Examiner* — Bob Zadeh
(74) *Attorney, Agent, or Firm* — Jose Cherson Weissbrot

(57) ABSTRACT

Disclosed is an all-plastic spray gun, including a housing. The housing is connected to a gun body, a front end of the gun body is connected to a header cap, the header cap is connected to a water division head body, the water division head body is inserted into the gun body, the gun body is hinged to a trigger, the trigger is connected to a piston, the piston is slidably connected to a negative pressure column of the gun body, an upper end of the negative pressure column is provided with a plastic spring, the plastic spring is sleeved outside the gun body, a bottom end of the gun body is connected to a blank cap, the blank cap is connected to a large ring, a perforative suction tube is inserted into the blank cap.

10 Claims, 14 Drawing Sheets

ALL-PLASTIC SPRAY GUN

CROSS-REFERENCE TO RELATED APPLICATIONS

The present application is a continuation of International Application No. PCT/CN2023/115077, with an international filing date of Aug. 25, 2023, which is based upon and claims priority to Chinese Patent Application No. 202311044093.3, filed on Aug. 17, 2023, the entire contents of all of which are incorporated herein by reference.

TECHNICAL FIELD

The present invention relates to the technical field of spray guns, and particularly relates to an all-plastic spray gun.

BACKGROUND

A spray gun mainly applied to cleaning and greening in life is a spraying device, which sprays water or a liquid in a bottle in the forms of mist, straight line and foam after a suction tube sucks the water.

Some existing sprayers for bottles substantially take a metal spring as power. A glass bead used as a water division device makes the liquid corrode the above two accessories, which indirectly causes slight injury to human body. The spray gun is neither environmental-friendly nor healthy to use, is difficult to recover, and cannot be recycled. The spray gun without a conventional metal spring and the glass bead is of an all-plastic structure, and the whole spray gun is only made from two materials, which can be integrally recycled. At present, although some sprayers are capable of achieving a continuous pressure function to achieve an injection purpose, a continuous pressure assembly for achieving injection is relatively complicated, and is formed by matching a piston, a spring, a longitudinal check valve, and the like. The above parts all are independent split parts, so that the assembling process of a product is relatively tedious.

BRIEF SUMMARY OF THE INVENTION

To solve the above technical problems, the present invention provide an all-plastic spray gun, including a housing, wherein the housing is connected to a gun body, a front end of the gun body is connected to a header cap, the header cap is connected to a water division head body, the water division head body is inserted into the gun body, the gun body is hinged to a trigger, the trigger is connected to a piston, the piston is slidably connected to a negative pressure column, an upper end of the negative pressure column is provided with a plastic spring, the plastic spring is sleeved outside the gun body, a bottom end of the gun body is connected to a blank cap, the blank cap is connected to a large ring, a perforative suction tube is inserted into the blank cap, the suction tube is connected to the gun body, the gun body is provided with a water outlet hole corresponding to the suction tube, and the gun body is internally provided with a glass bead in the water outlet hole.

Preferably, an upper end surface of a bottom of the gun body is provided with a spacing ring, the spacing ring is arranged to be semicircular-shaped, and the gun body is provided with a buckle located at a side edge of the spacing ring.

Preferably, an inner side of the trigger is provided with a first slot for mounting a piston rod, the piston rod is connected to the piston, and a position, located above the first slot, of the trigger is provided with a second slot for connecting the plastic spring.

Preferably, an inner wall at a top of the housing is provided with an insertion groove corresponding to the gun body, an inner wall at a bottom of the housing is provided with a fixture block, and the fixture block is provided with an arc-shaped groove.

Preferably, the gun body is provided with a clamp, the clamp includes a hoop and a support bar, the hoop is provided with an opening, and a side wall of the hoop is fixedly connected to the support bar.

Preferably, a top of the large ring is provided with an annular flange, and a gasket is mounted inside the large ring below the flange.

Preferably, the cover body can be matched with an open position at a rear end of the water division head body through the buckle, and the water division head body is in interference fit with the spring water division rod.

Preferably, the plastic spring includes a first support portion and a second support portion, a joint between upper ends of the first support portion and the second support portion is provided with an insertion block for being inserted into a second slot, bottom ends of the first support portion and the second support portion are connected to a bottom support portion, and the bottom support portion is provided with a groove.

Preferably, a lock piece is mounted on an upper end surface of a joint between the housing and the header cap.

Preferably, a position, close to a water outlet, of an inner wall of the header cap is provided with a liquid inlet groove, an edge of an end surface where the header cap contacts with a bearing rib is provided with four bosses, the four bosses are located at corners of the header cap, and a limit groove is formed between two adjacent bosses.

The present invention has the following technical effects and advantages:

1. In the present invention, by adopting the plastic spring to play a supporting role, the spray gun can be integrally recovered, a situation that a metal spring is used as power is avoided, and pollution of a liquid as the spring is corroded by the liquid is also avoided.

2. In the present invention, the trigger pushes the piston to compress water into the gun body, and in this case, the glass bead in the blank cap droops to seal the blank cap so as to prevent the water from flowing backwards. The liquid flows upwards to the spring water division rod to push the spring water division rod to compress, and the spring water division rod is elastically reset to push out the liquid to generate a continuous pressure, so that vaporific mist is generated at a high pressure and a high speed through the header cap.

3. In the present invention, the spring water division rod is mounted in the water division head body, and is then fixed by the cover body, so that the spray gun features simple structure and low mounting cost.

3. In the present invention, the lock piece is matched with the limit groove, so that the header cap has a locking function and is not easily rotated, and therefore, the safety is improved.

4. In the present invention, the arranged gasket and flange play a protecting role to the bottle opening to prevent a situation that the bottle opening is damaged as the spray gun collides with other objects in transportation.

5. In the present invention, the arranged clamp prevents a situation that the liquid leaks at the position where the piston is matched with the gun body as the trigger collides with other objects in transportation.

Figure 1:
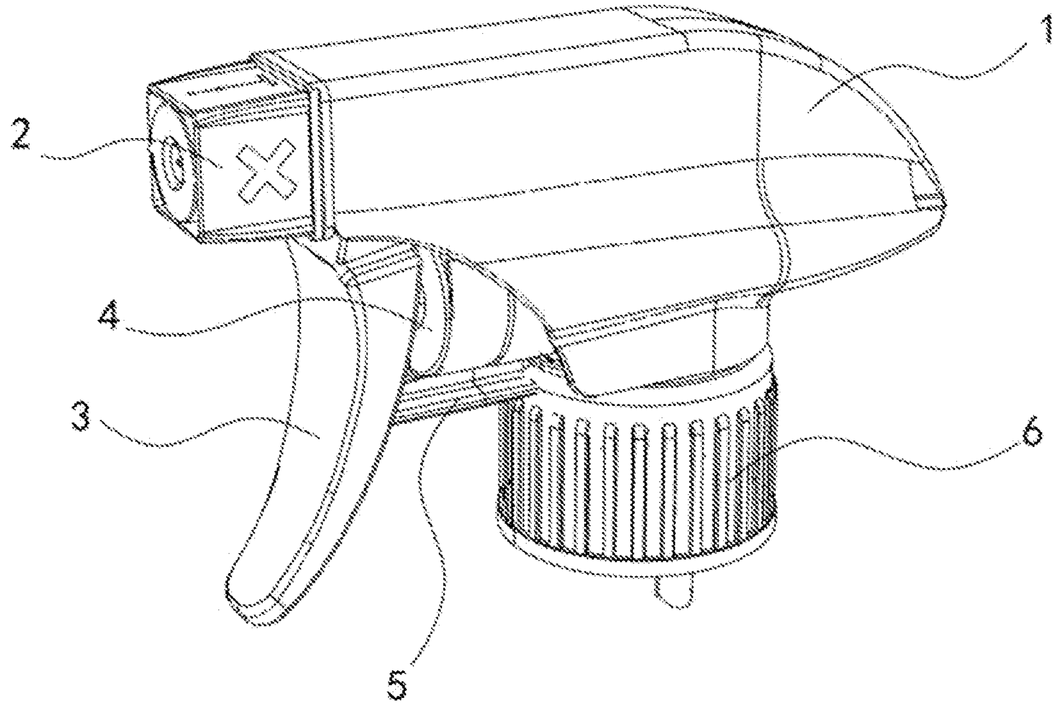
FIG. 1 is a structural schematic diagram of an all-plastic spray gun provided by an embodiment of the application.

In the drawings, 1, housing; 101, insertion groove; 102, fixture block; 103, lock piece; 2, header cap; 201, liquid inlet groove; 202, boss; 203, limit groove; 204, convex surface; 3, trigger; 301, first slot; 302, second slot; 4, piston; 401, piston rod; 5, clamp; 501, hoop; 502, support bar; 6, large ring; 601, flange; 602, gasket; 7, gun body; 701 water outlet hole; 702, communication hole; 703, buckle; 704, arc-shaped hole; 705, strip hole; 706, spacing ring; 707, bearing rib, 708, clamping strip; 709, water inlet hole; 8, plastic spring; 801, first support portion; 802, second support portion; 803, bottom support portion; 804, groove; 805, insertion block; 806, first end surface; 807, second end surface; 808, third end surface; 809, fourth end surface; 810, fifth end surface; 811, lug boss; 9, water division head body; 91, anterior segment portion; 92, posterior segment portion; 93, first opening; 94, second opening; 95, shoulder; 96, convex rib; 97, continuous pressure cavity; 10, blank cap; 11, suction tube; 12, glass bead; 13, cover body; 131, positioning column, 14, spring water division rod; 141, positioning seat; 142, sealing portion; 143, elastic arm; 144, seal ring; 145, cambered surface; 146, guide pillar; 147, positioning hole.

DETAILED DESCRIPTION OF THE INVENTION

The present invention will be further described in detail below in combination with drawings and specific implementations. Embodiments of the present invention are provided for the purpose of illustration and description, and are not exhaustive or not limit the present invention to the disclosed form. Many modifications and variations will be apparent to those of ordinary skill in the art. The embodiment is chosen and described to better describe the principles and practical application of the present invention, and to enable those of ordinary skill in the art to understand the present invention and then design various embodiments with various modifications suitable to specific uses.

Figure 2:
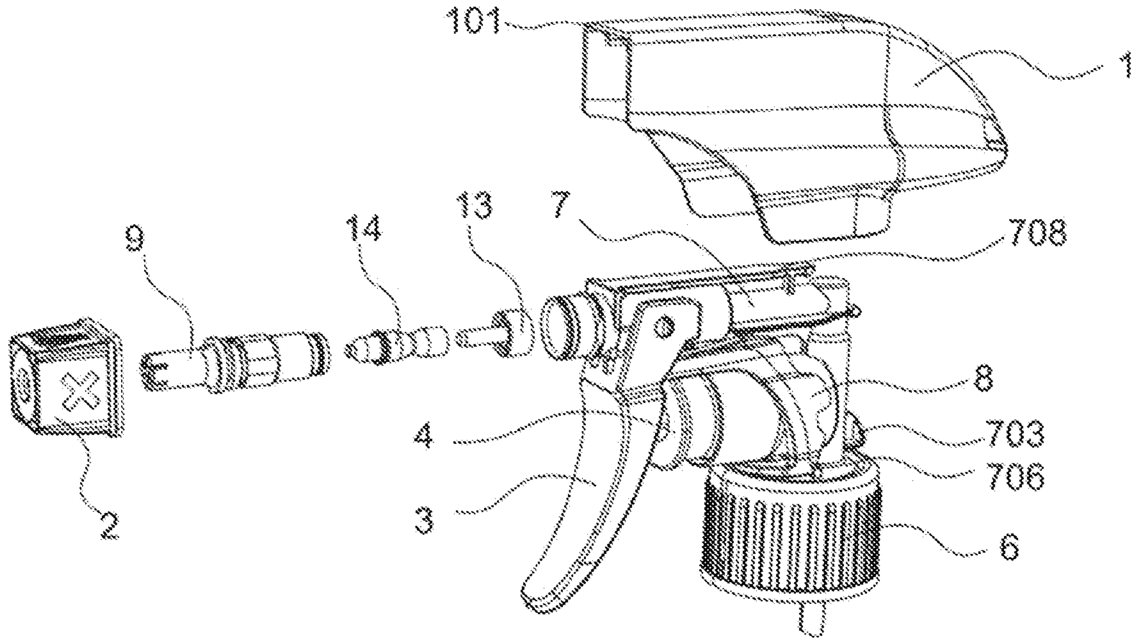
FIG. 2 is an exploded view of the all-plastic spray gun provided by the embodiment of the application.
Figure 3:
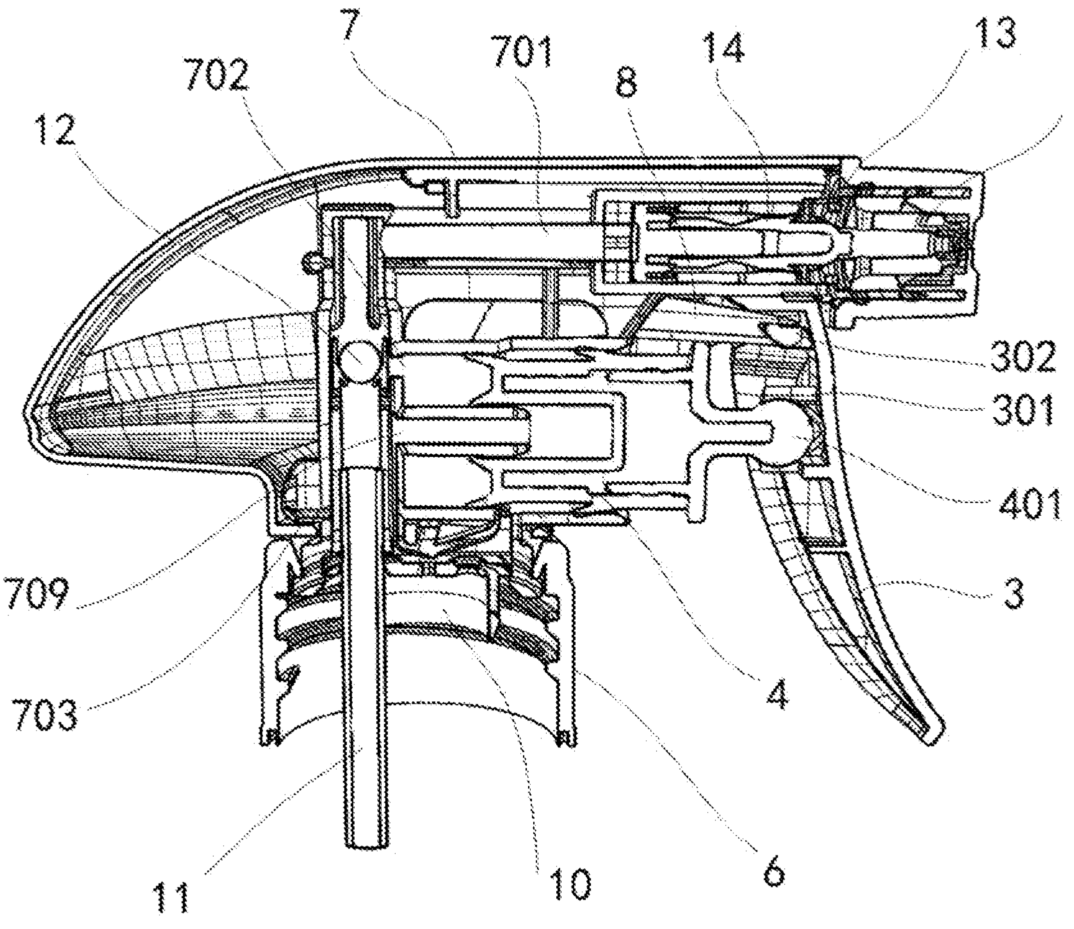
FIG. 3 is a sectional view of the all-plastic spray gun provided by the embodiment of the application.

Referring to FIGS. 1-3, in the embodiment, provided is an all-plastic spray gun, including a housing 1, wherein the housing 1 is connected to a gun body 7, a front end of the gun body 7 is connected to a header cap 2, the header cap 2 is connected to a water division head body 9, a spring water division rod 14 is inserted into the water division head body 9, a cover body 13 is inserted into the spring water division rod 14, the water division head body 9 is inserted into the gun body 7, the gun body 7 is hinged to a trigger 3, the trigger 3 is connected to a piston 4, the piston 4 is slidably connected to a negative pressure column of the gun body 7, the trigger 3 is pressed by a finger to drive the piston 4 to move along the negative pressure column of the gun body 7, an upper end of the negative pressure column is provided with a plastic spring 8, the plastic spring 8 is sleeved outside the gun body 7, one end of the plastic spring 8 is connected to the trigger 3, a bottom end of the gun body 7 is connected to a blank cap 10, the blank cap 10 is connected to a large ring 6, a perforative suction tube 11 is inserted into the blank cap 10, the suction tube 11 is connected to the gun body 7, the gun body 7 is provided with a water outlet hole 701 corresponding to the suction tube 11, and the gun body 7 is internally provided with a glass bead 12 in the water outlet hole 701. The glass bead 12 is located at an upper end of the suction tube 11, a bottom of the water outlet hole 701 is communicated with a communication hole 702, the communication hole 702 is communicated with the negative pressure column, the gun body 7 is provided with a water inlet hole 709 below the communication hole 702, an upper end surface of a bottom of the gun body 7 is provided with a spacing ring 706, the spacing ring 706 is arranged to be semicircular-shaped, the gun body 7 is provided with a buckle 703 located at a side edge of the spacing ring 706, the buckle 703 is matched with the housing 1 to prevent the housing 1 from being separated from the buckle 703, and the spring water division rod is mounted in the water division head body, and then is fixed by the cover body, so that the spray gun features simple structure and low mounting cost.

Further, an inner side of the trigger 3 is provided with a first slot 301 for mounting a piston rod 401, the piston rod 401 is connected to the piston 4, and a position, located above the first slot 301, of the trigger 3 is provided with a second slot 302 for connecting the plastic spring 8.

The trigger 3 is pressed by a finger to extrude the plastic spring 8 to deform and to drive the piston 4 to enter the negative pressure column. The trigger 3 is loosened, so that the plastic spring 8 is reset to push the trigger 3 to reset. A liquid enters the negative pressure column from the suction tube 11 and the water inlet hole 709. The trigger 3 is pressed, so that the piston 4 enters the negative pressure column to extrude the liquid to enter the water outlet hole 701 from the communication hole 702. In this case, the glass bead 12 in the blank cap 10 droops to seal the blank cap 10 to prevent the liquid from flowing backwards. The liquid flows upwards to the position of the water division head body 9 and is sprayed out in a fine waterway and a rotary waterway through the header cap 2.

Figure 4:
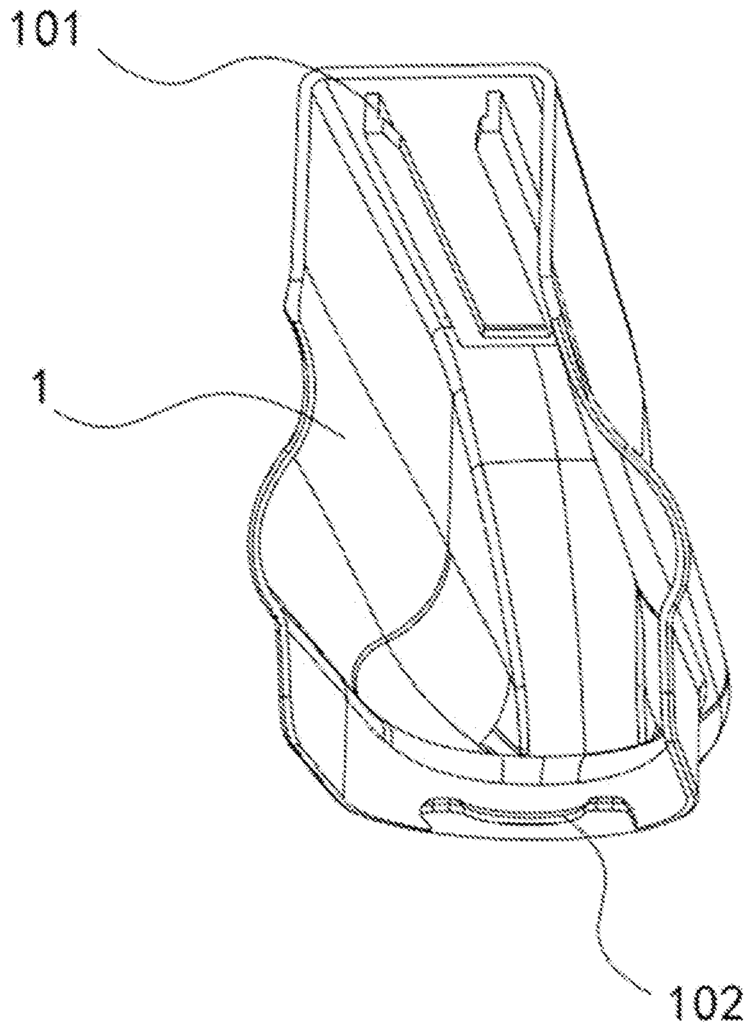
FIG. 4 is a structural schematic diagram of a housing in the all-plastic spray gun provided by an embodiment of the application.

In the embodiment, referring to FIG. 2 and FIG. 4, an inner wall at a top of the housing 1 is provided with an insertion groove 101 corresponding to the gun body 7, an inner wall at a bottom of the housing 1 is provided with a fixture block 102, the fixture block 102 is provided with an arc-shaped groove, and the fixture block 102 is inserted into a gap between the buckle 703 and the gun body 7 to prevent a displacement between the bottom of the housing 1 and the gun body 7. The top of the gun body 7 is provided with a clamping strip 708, the clamping strip 708 is inserted into the insertion groove 101, and a tail end of the clamping strip 708 is provided with a boss. When the clamping strip 708 is inserted into the insertion groove 101, the tail end of the clamping strip 708 is inserted into a tail end of the insertion groove 101, and the boss fits the tail end of the insertion groove 101. Meanwhile, an inner wall of the arc-shaped groove at the fixture block 102 clings to an outer wall of the gun body 7, so that the housing 1 and the gun body 7 are mounted to prevent the gun body 7 from loosening.

Figure 5:
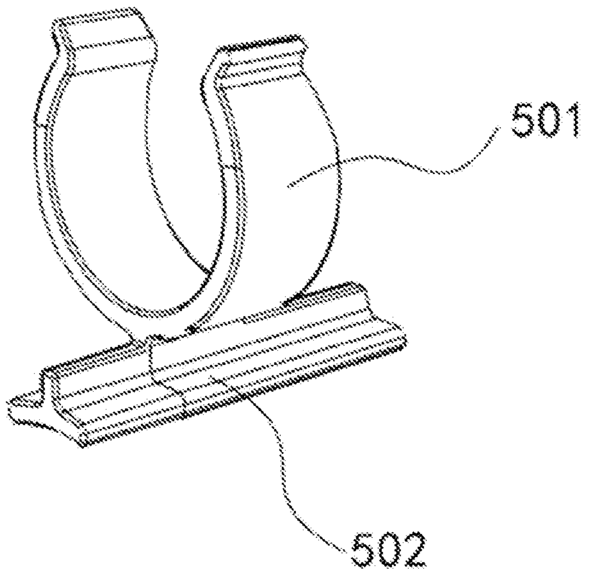
FIG. 5 is a structural schematic diagram of a clamp in the all-plastic spray gun provided by an embodiment of the application.

In the embodiment, referring to FIG. 5, the gun body 7 is provided with a clamp 5, the clamp 5 includes a hoop 501 and a support bar 502, the hoop 501 is provided with an opening, and a side wall of the hoop 501 is fixedly connected to the support bar 502. A side section of the support bar 502 is in a reversed T shape. During mounting, one end of the support bar 502 fits the inner wall of the trigger 3 and the other end of the support bar 502 fits the outer wall of the gun body 7. The hoop 501 clamps the outer side of the negative pressure column to prevent a situation that the liquid leaks at the position where the piston 4 is matched with the gun body 7 as the trigger 3 collides with other objects.

Figure 6:
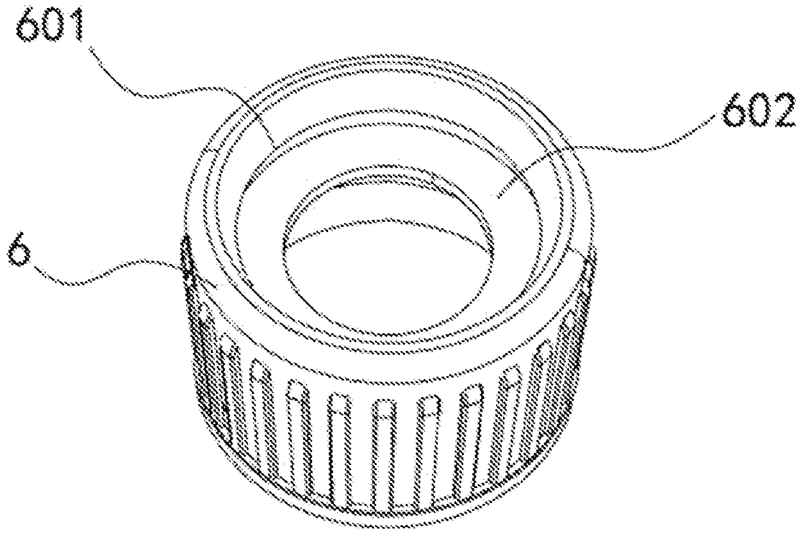
FIG. 6 is a structural schematic diagram of a large ring in the all-plastic spray gun provided by an embodiment of the application.
Figure 7:
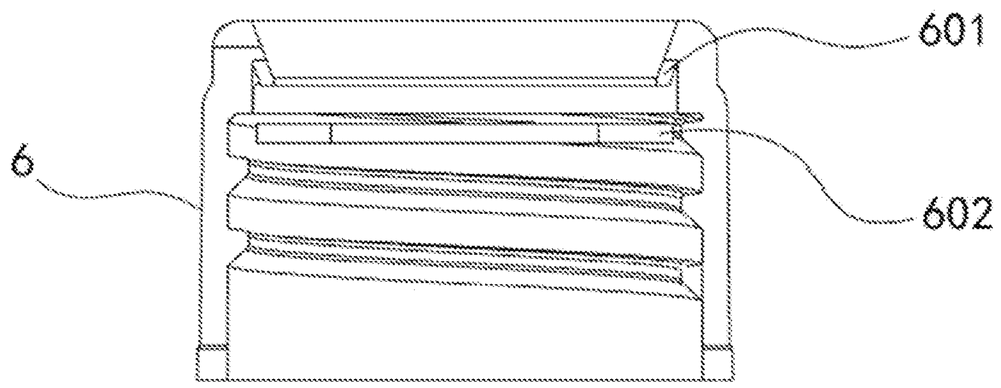
FIG. 7 is a sectional view of the large ring in the all-plastic spray gun provided by the embodiment of the application.
Figure 8:
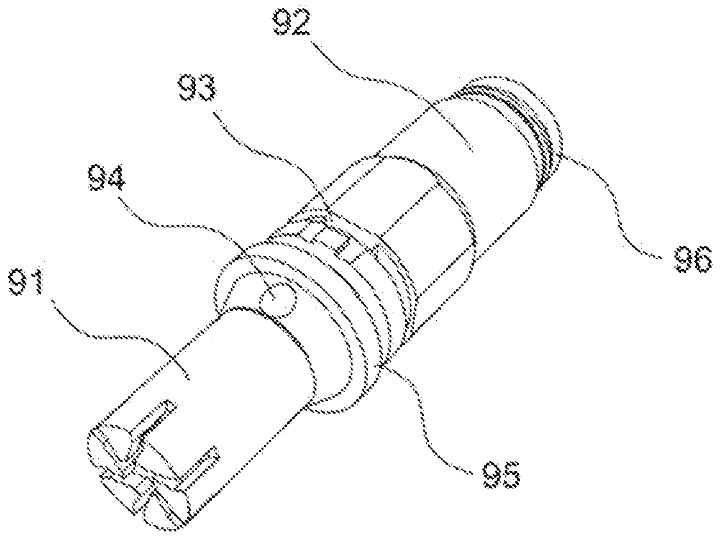
FIG. 8 is a structural schematic diagram of a water division head body in the all-plastic spray gun provided by an embodiment of the application.
Figure 9:
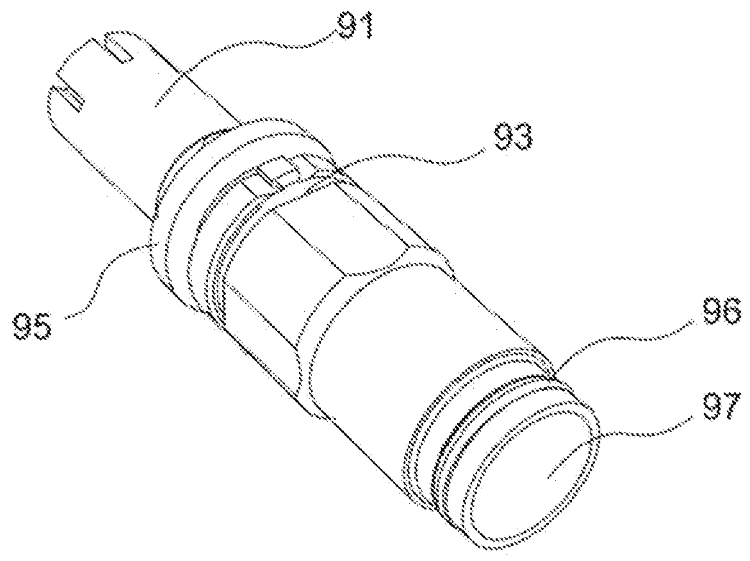
FIG. 9 is a structural schematic diagram of a rear end of the water division head body in the all-plastic spray gun provided by an embodiment of the application.
Figure 10:
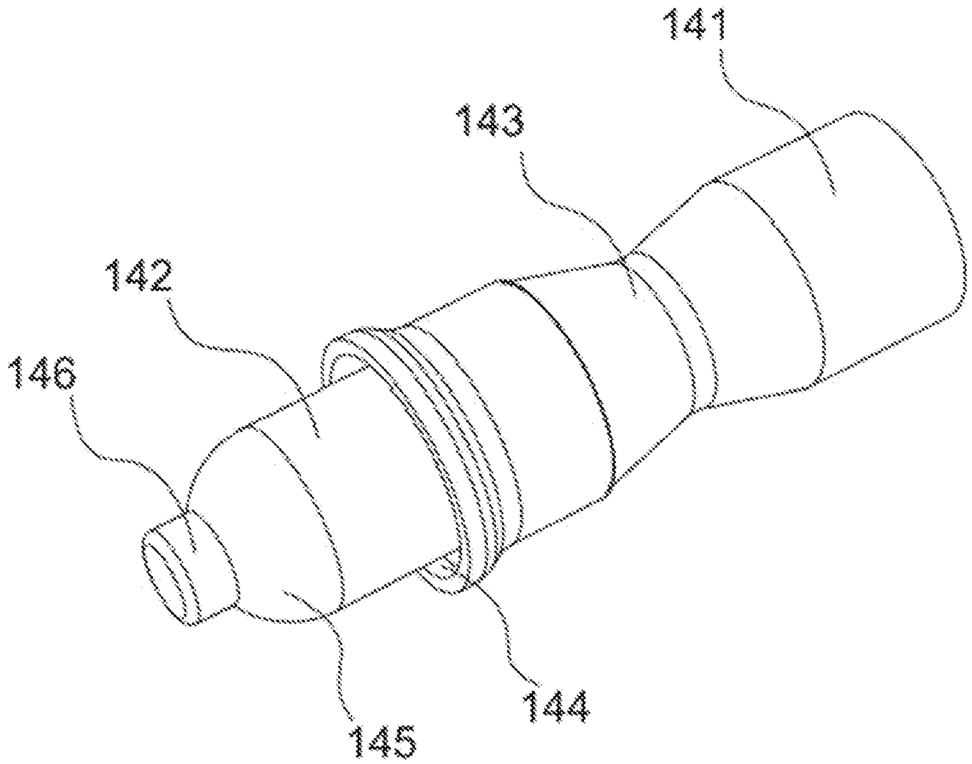
FIG. 10 is a structural schematic diagram of a spring water division rod in the all-plastic spray gun provided by an embodiment of the application.
Figure 11:
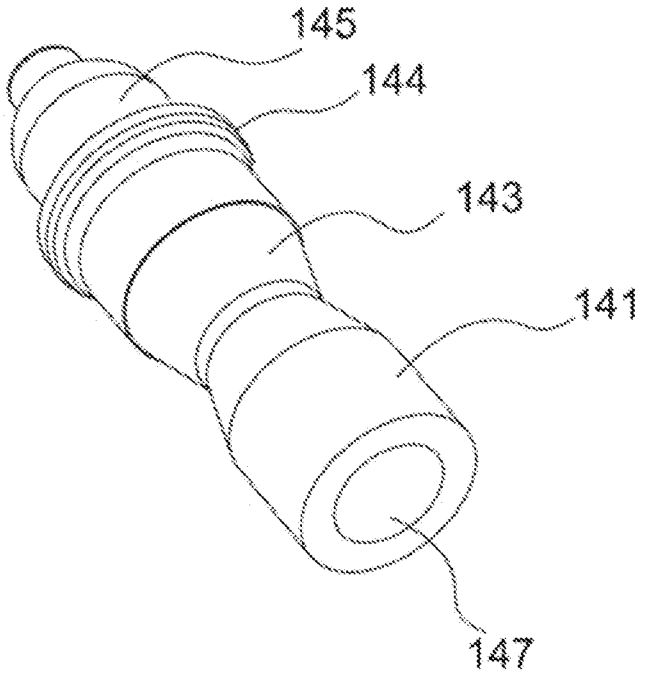
FIG. 11 is a structural schematic diagram of a rear end of the spring division rod in the all-plastic spray gun provided by an embodiment of the application.
Figure 12:
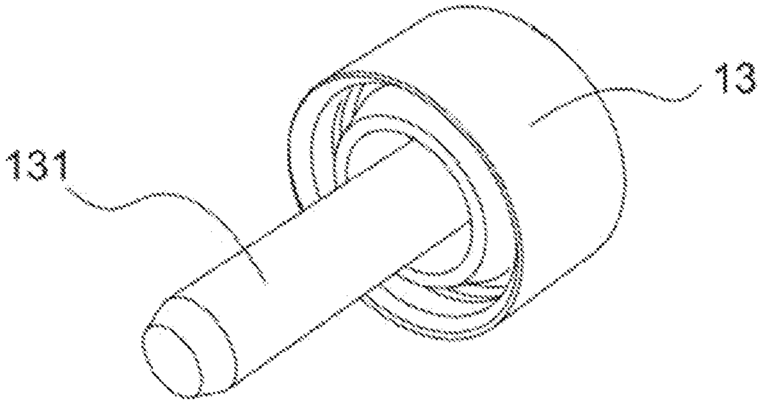
FIG. 12 is a structural schematic diagram of a cover body in the all-plastic spray gun provided by an embodiment of the application.

In the embodiment, referring to FIG. 6 and FIG. 7, a top of the large ring 6 is provided with an annular flange 601, the flange 601 is in a reversed conical shape, and a gasket 602 is mounted inside the large ring 6 below the flange 601. The gasket 602 is circular. After the large ring 6 is connected to the gun body 7, an upper end surface of the flange 601 clings to the bottom end of the gun body 7 to prevent liquid leakage at the large ring 6. The arranged gasket 602 and flange 601 play a protecting role to the bottle opening to prevent a situation that the bottle opening is damaged as the spray gun collides with other objects in transportation.

In the embodiment, referring to FIGS. 8-12, the cover body 13 can be matched with an open position at a rear end of the water division head body 9 through the buckle to effectively prevent the continuous pressure function from being affected as the liquid enters the spring water division rod 14. The water division head body 9 is integrally columnar, and is internally provided with a continuous pressure cavity 97 where the spring water division rod 14 is inserted into. The water division head body 9 is provided with a shoulder 95 at a joint between an anterior segment portion 91 and a posterior segment portion 92. The shoulder 95 divides the water division head body 9 into the anterior segment portion 91 located in the front portion and the posterior segment portion 92 located in the rear portion. An end of the anterior segment portion 91 is provided with a division channel for gathering the liquid and spraying the liquid out from the header cap 2. Second openings 94 are formed at an interval in the anterior segment portion 91 of the water division head body 9 in a circumferential direction. Each of the second openings 94 forms a liquid outlet communicated with the water outlet hole 701. First openings 93 are formed at an interval in the posterior segment portion 92 of the water division head body 9 in the circumferential direction. Each of the first openings 93 forms a liquid inlet communicated with the continuous pressure cavity 97. An end of the posterior segment portion 92 is provided with a convex rib 96 for being mounted with the buckle of the cover body 13 in a fit manner.

The spring water division rod 14 includes a positioning seat 141, wherein the positioning seat 141 is provided with a positioning hole 147, the cover body 13 is provided with a positioning column 131 corresponding to the positioning hole 147, and the positioning column 131 is inserted into the positioning hole 147. After the cover body 13 is connected to the convex rib 96, the spring water division rod 14 is mounted in the water division head body 9. A side end of the positioning seat 141 is connected to an elastic arm 143 which is in an hourglass shape, and the other end of the elastic arm 143 is connected to a sealing portion 142. An outer edge of the sealing portion 142 is provided with a seal ring 144. The spring water division rod 14 is inserted into the continuous pressure cavity 97 to play a closing role through the seal ring 144. A front end of the sealing portion 142 is provided with a cambered structure 145 in close fit with an inner conical surface of the water division head body 9. A front end of the cambered structure 145 is further provided with a guide pillar 146 extending forwards. The spring water division rod 14 is in clearance fit with the water division head body 9 to effectively prevent the continuous pressure function from being affected as the liquid enters the water division head body 9.

Figure 13:
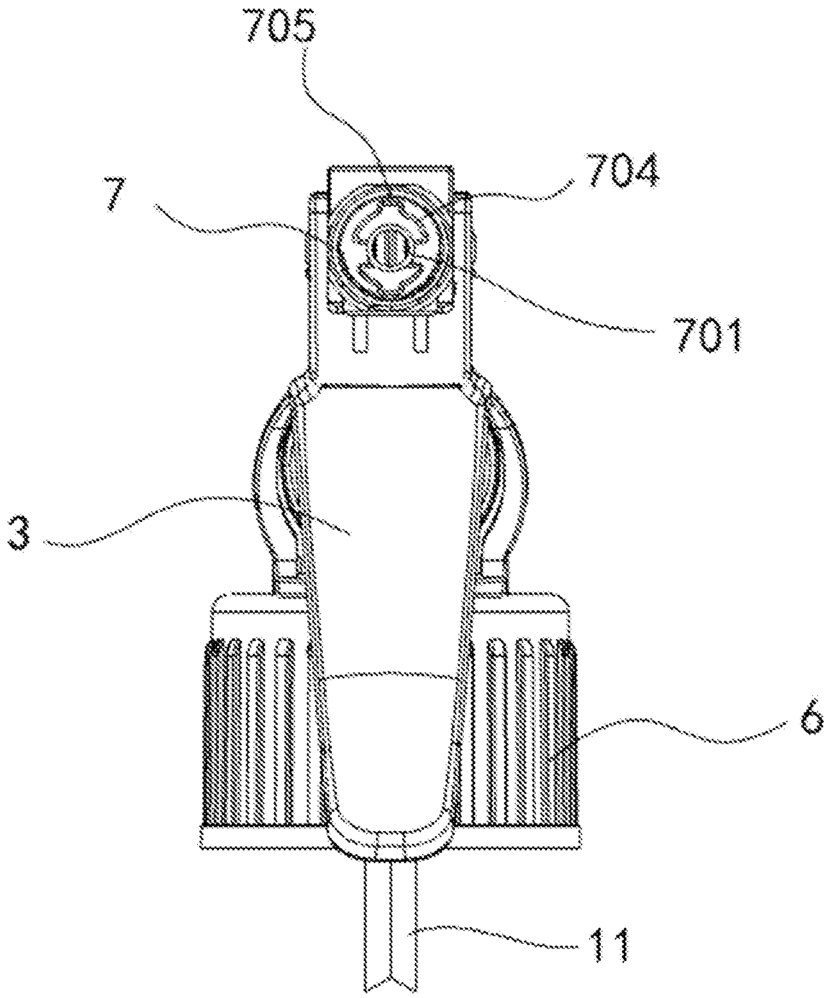
FIG. 13 is a front view of the all-plastic spray gun provided by the embodiment of the application.

In the embodiment, referring to FIG. 13, the gun body 7 is provided with an arc-shaped hole 704 and a strip hole 705 at the opening of the water outlet hole 701, which facilitates positioning and mounting of the water division head body 9.

Figure 14:
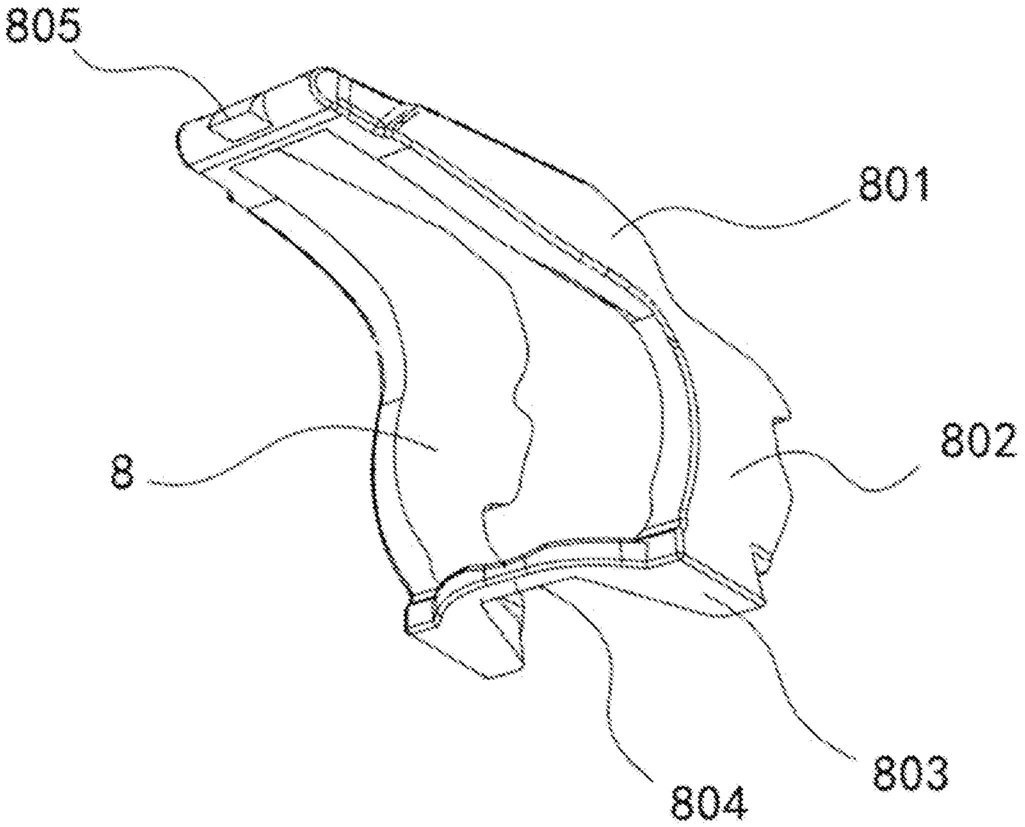
FIG. 14 is a structural schematic diagram of a plastic spring in the all-plastic spray gun provided by an embodiment of the application.
Figure 15:
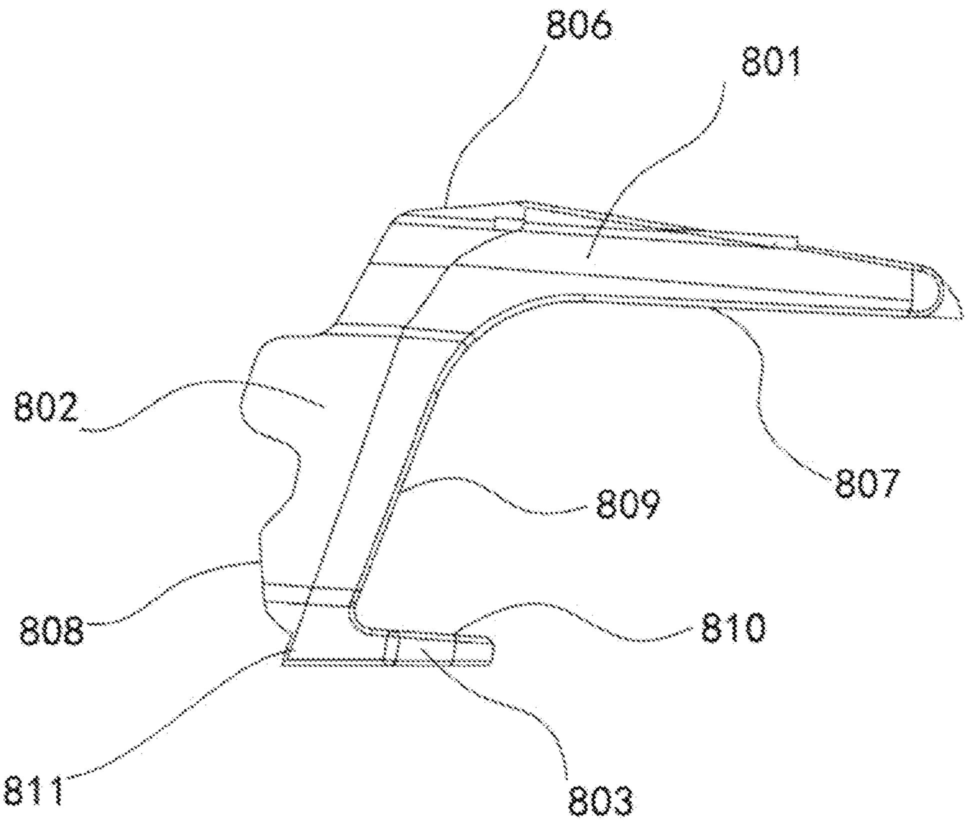
FIG. 15 is a side view of the plastic spring in the all-plastic spray gun provided by the embodiment of the application.

In the embodiment, referring to FIG. 14 and FIG. 15, the plastic spring 8 includes a first support portion 801 and a second support portion 802, wherein a joint between upper ends of the first support portion 801 and the second support portion 802 is provided with an insertion block 805 for being inserted into a second slot 302, bottom ends of the first support portion 801 and the second support portion 802 are connected to a bottom support portion 803, the bottom support portion 803 is provided with a groove 804 clamped outside the gun body 7, an upper end of the first support portion 801 is provided with a first end surface 806, a lower end of the first support portion 801 is provided with a second end surface 807, an outer side wall of the second support portion 802 is provided with a third end surface 808, an inner side wall of the second support portion 802 is provided with a fourth end surface 809, an upper end of the bottom support portion 803 is provided with a fifth end surface 810, the plastic spring 8 is provided with a lug boss 811 on an inner side of the bottom support portion 803, and the lug boss 811 is clamped at the spacing ring 706 to prevent a displacement generated at the bottom of the plastic spring 8.

Specifically, an included angle between the first end surface 806 and the fifth end surface 810 is 5 degrees, with a deformation range being 45-35 degrees; an included angle between the second end surface 807 and the fourth end surface 809 is 109 degrees, with a deformation range being 60-140 degrees; an included angle between the third end surface 808 and the fifth end surface 810 is 95 degrees, with a deformation range being 45-125 degrees; and an included angle between the fourth end surface 809 and the fifth end surface 810 is 73 degrees, with a deformation range being 20-100 degrees.

By designing the included angles in the plastic spring 8, the angle of deformation generated by pressing the plastic spring 8 by the trigger 3 is 8±20 degrees. When the trigger 3 is pressed, the plastic spring 8 is easy to deform, and when the trigger 3 is loosened, the plastic spring 8 is easy to reset.

Figure 16:
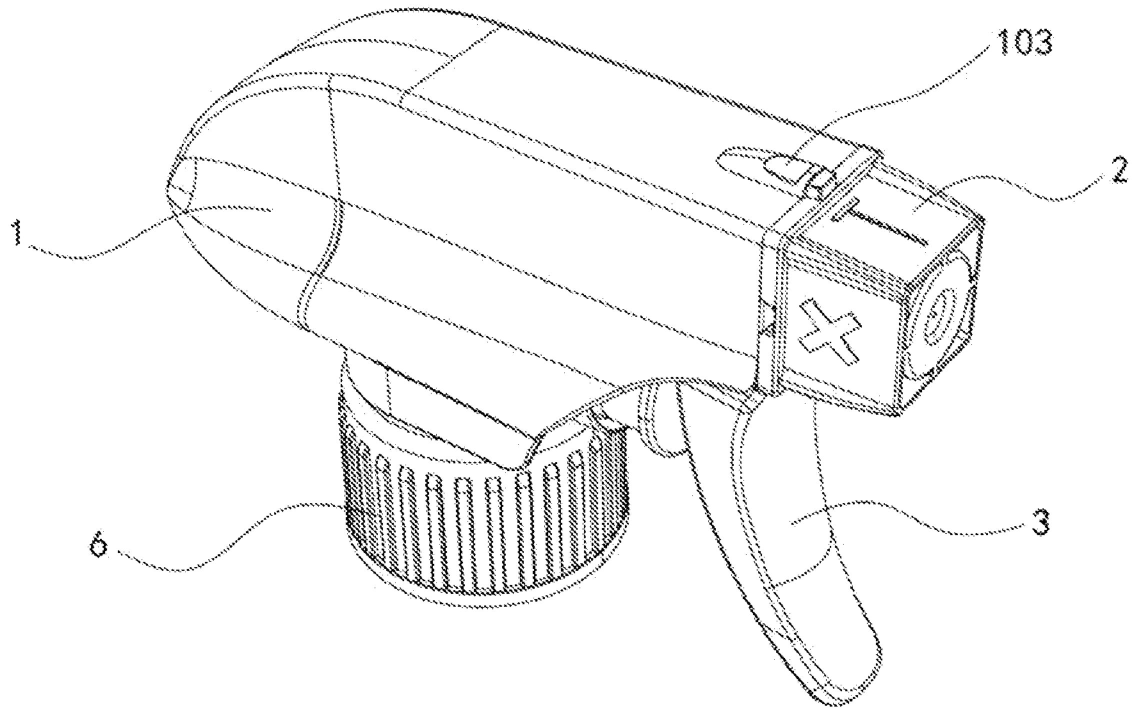
FIG. 16 is a structural schematic diagram of an all-plastic spray gun provided by another embodiment of the application.
Figure 17:
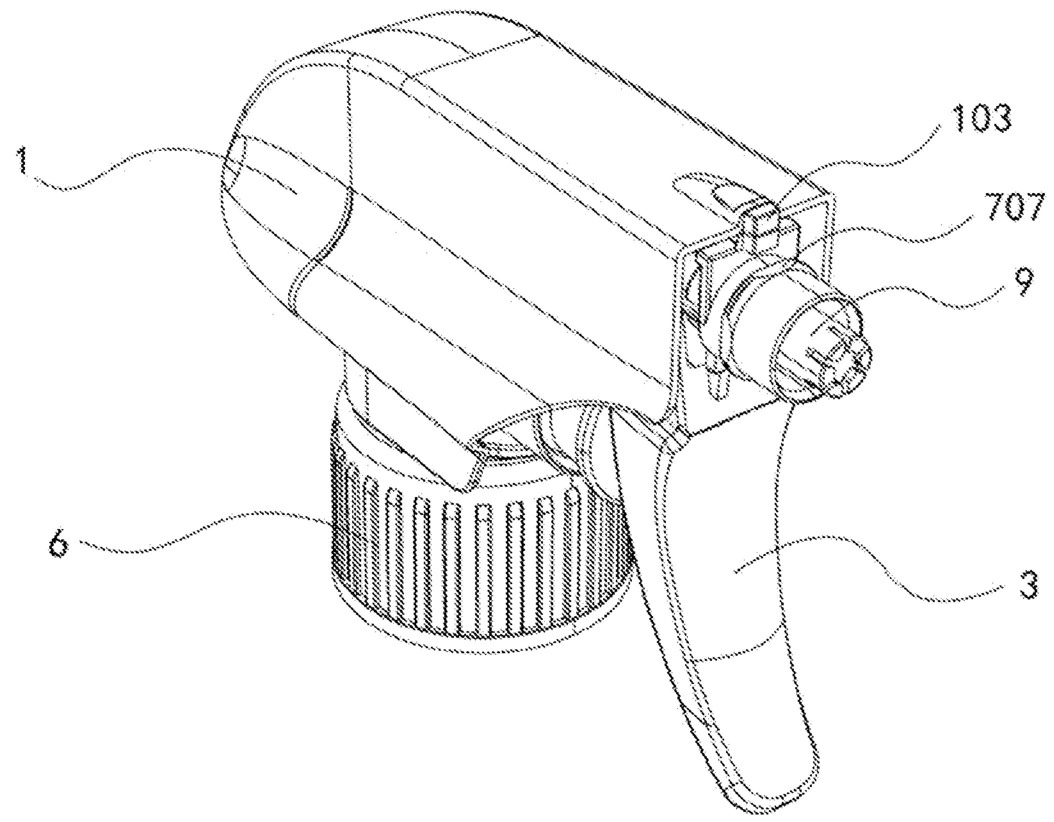
FIG. 17 is a structural schematic diagram of a housing in the all-plastic spray gun provided by another embodiment of the application.
Figure 18:
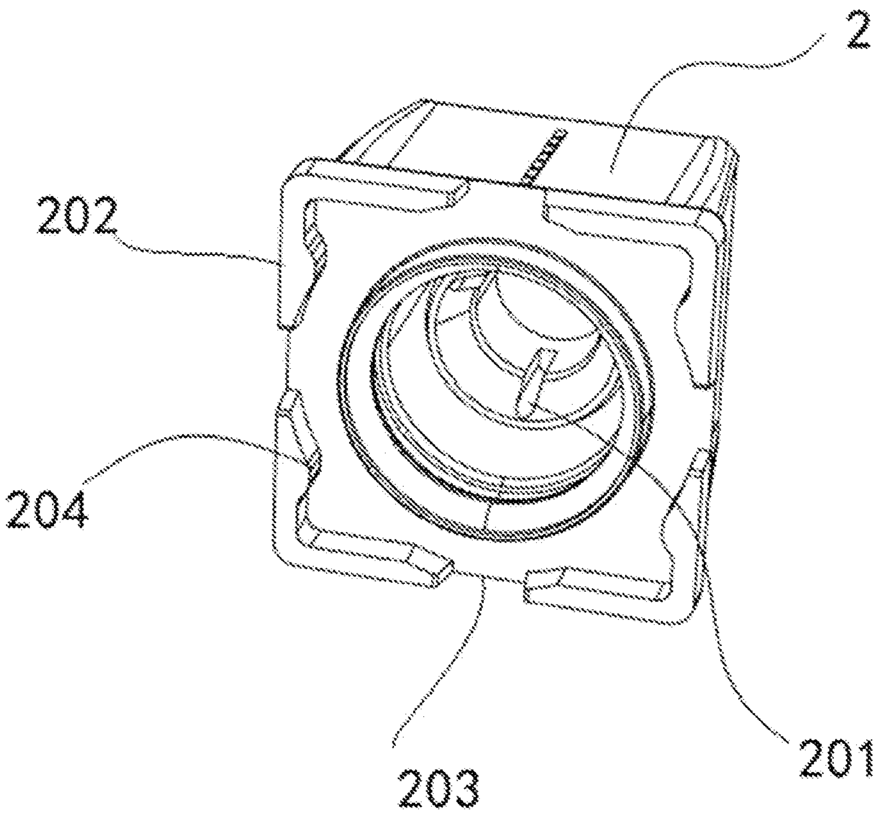
FIG. 18 is a structural schematic diagram of a header cap in the all-plastic spray gun provided by another embodiment of the application.

In another embodiment, referring to FIGS. 16-18, a lock piece 103 is mounted on an upper end surface of a joint between the housing 1 and the header cap 2. An outer wall, close to the lock piece 103, of the gun body 7 is provided with a bearing rib 707. An inner wall of the header cap 2 is provided with an annular groove corresponding to the bearing rib 707, so that the header cap 2 is capable of being rotatably connected to the gun body 7. A position, close to a water outlet, of an inner wall of the header cap 2 is provided with a liquid inlet groove 201. An edge of an end surface where the header cap 2 contacts with the bearing rib 707 is provided with four bosses 202. The four bosses 202 are located at corners of the header cap 2. A limit groove 203 is formed between two adjacent bosses 202. A convex surface 204 is arranged on each of adjacent inner walls of the two bosses 202. The convex surface 204 is matched with the bearing rib 707.

In the embodiment, the lock piece 103 limits rotation of the header cap 2 to lock a nozzle. During unlocking, the upper end surface of the lock piece 103 is pressed, so that the lock piece 103 is separated from the header cap 2. Then the header cap 2 is rotated to open the nozzle. The lock piece 103 is an elastic chuck and is matched with the limit groove 203, so that the header cap 2 has the locking function and is not easily rotated, and therefore, the safety is improved.

The working principle of the present invention is as follows:

In the present invention, the header cap 2 has the locking function, so that the header cap 2 is not easily rotated, and therefore, the safety is improved. By adopting the plastic spring 8 to play a supporting role, the spray gun can be integrally recovered, the situation that the metal spring is used as power is avoided, and pollution of the liquid as the spring is corroded by the liquid is also avoided. The trigger pushes the piston to compress water into the gun body, and in this case, the glass bead in the blank cap droops to seal the blank cap so as to prevent the water from flowing backwards. The liquid flows upwards to the spring water division rod to push the spring water division rod to compress, and the spring water division rod is elastically reset to push out the liquid to generate a continuous pressure, so that vaporific mist is generated at a high pressure and a high speed through the header cap.

Apparently, the described embodiments are merely some rather than all of the embodiments of the present invention. Based on the embodiments of the present invention, all the other embodiments obtained by those of ordinary skill in the art and relevant arts without inventive effort are fall within the scope of the present invention. Structures, devices and operating methods not specifically described and explained in the present invention are implemented according to conventional means in the art unless otherwise specified and limited.

The invention claimed is:

1. An all-plastic spray gun, comprising a housing, wherein the housing is connected to a gun body, a front end of the gun body is connected to a header cap, the header cap is connected to a water division head body, a spring water division rod is inserted into the water division head body, a cover body is inserted into the spring water division rod, the water division head body is inserted into the gun body, the gun body is hinged to a trigger, the trigger is connected to a piston, the piston is slidably connected to a negative pressure column of the gun body, an upper end of the negative pressure column is provided with a plastic spring, the plastic spring is sleeved outside the gun body, a bottom end of the gun body is connected to a blank cap, the blank cap is connected to a large ring, a perforative suction tube is inserted into the blank cap, the suction tube is connected to the gun body, the gun body is provided with a water outlet hole corresponding to the suction tube, and the gun body is internally provided with a glass bead in the water outlet hole.

2. The all-plastic spray gun of claim 1, wherein an upper end surface of a bottom of the gun body is provided with a spacing ring, the spacing ring is arranged to be semicircular-shaped, and the gun body is provided with a buckle located at a side edge of the spacing ring.

3. The all-plastic spray gun of claim 2, wherein an inner side of the trigger is provided with a first slot for mounting a piston rod, the piston rod is connected to the piston, and a position, located above the first slot, of the trigger is provided with a second slot for connecting the plastic spring.

4. The all-plastic spray gun of claim 3, wherein an inner wall at a top of the housing is provided with an insertion groove corresponding to the gun body, an inner wall at a bottom of the housing is provided with a fixture block, and the fixture block is provided with an arc-shaped groove.

5. The all-plastic spray gun of claim 1, wherein the gun body is provided with a clamp, the clamp comprises a hoop and a support bar, the hoop is provided with an opening, and a side wall of the hoop is fixedly connected to the support bar.

6. The all-plastic spray gun of claim 1, wherein a top of the large ring is provided with an annular flange, and a gasket is mounted inside the large ring below the flange.

7. The all-plastic spray gun of claim 1, wherein the cover body can be matched with an open position at a rear end of the water division head body through the buckle, and the water division head body is in interference fit with the spring water division rod.

8. The all-plastic spray gun of claim 1, wherein the plastic spring comprises a first support portion and a second support portion, a joint between upper ends of the first support portion and the second support portion is provided with an insertion block for being inserted into a second slot, bottom ends of the first support portion and the second support portion are connected to a bottom support portion, and the bottom support portion is provided with a groove.

9. The all-plastic spray gun of claim 1, wherein a lock piece is mounted on an upper end surface of a joint between the housing and the header cap.

10. The all-plastic spray gun of claim 9, wherein a position, close to a water outlet, of an inner wall of the header cap is provided with a liquid inlet groove, an edge of an end surface where the header cap contacts with a bearing rib is provided with four bosses, the four bosses are located at corners of the header cap, and a limit groove is formed between two adjacent bosses.

* * * * *